United States Patent
Huang et al.

(10) Patent No.: US 11,703,910 B2
(45) Date of Patent: Jul. 18, 2023

(54) DOCKING STATION, ELECTRICAL DEVICE, AND METHOD FOR CONFIGURING BASIC INPUT OUTPUT SYSTEM

(71) Applicant: Realtek Semiconductor Corporation, Hsinchu (TW)

(72) Inventors: Zhen-Ting Huang, Yunlin County (TW); Chun-Hao Lin, New Taipei (TW); Er-Zih Wong, Taichung (TW); Hung-Chang Chen, Hsinchu County (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 406 days.

(21) Appl. No.: 15/868,986

(22) Filed: Jan. 11, 2018

(65) Prior Publication Data

US 2019/0079777 A1  Mar. 14, 2019

Related U.S. Application Data (60) Provisional application No. 62/555,659, filed on Sep. 8, 2017.

(51) Int. Cl.
| | |
|---|---|
| *G06F 9/4401* | (2018.01) |
| *G06F 13/40* | (2006.01) |
| *G06F 13/42* | (2006.01) |
| *G06F 13/38* | (2006.01) |

(Continued)

(52) U.S. Cl.
CPC .......... *G06F 1/1632* (2013.01); *G06F 9/4411* (2013.01); *G06F 13/385* (2013.01);
(Continued)

(58) Field of Classification Search
CPC .. G06F 9/4411; G06F 13/385; G06F 13/4081; G06F 13/4282; G06F 2213/0026; G06F 2213/0042
(Continued)

(56) References Cited

U.S. PATENT DOCUMENTS 9,467,731 B2 * 10/2016 Zhang ................... G06F 3/1462
2006/0097679 A1    5/2006 Jeong et al.
(Continued)

FOREIGN PATENT DOCUMENTS

| CN | 204046631 U | 12/2014 |
| CN | 105378694 A | 3/2016 |

OTHER PUBLICATIONS

Universal Serial Bus Type-C Cable and Connector Specification, Aug. 11, 2014 (Year: 2014).*

*Primary Examiner* — Idriss N Alrobaye
*Assistant Examiner* — Brooke J Taylor
(74) *Attorney, Agent, or Firm* — McClure, Qualey & Rodack, LLP (57) ABSTRACT

A docking station includes a network interface controller (NIC), a dock-side controller and a dock-side connector interface. The NIC is configured to transmit one or more management component transport protocol (MCTP) packets via a system management bus (SMbus). The dock-side controller is electrically coupled to the SMbus, and configured to encode the one or more MCTP packets to one or more vendor specific protocol (VSP) packets. The dock-side connector interface is electrically coupled to the dock-side controller, and configured to transmit the one or more VSP packets to an electrical device to control a basic input output system (BIOS) of the electrical device on the condition that the electrical device is connected to the docking station via the dock-side connector interface.

20 Claims, 5 Drawing Sheets

(51) Int. Cl.
*G06F 1/16* (2006.01)
*H04L 101/622* (2022.01)

(52) U.S. Cl.
CPC ...... *G06F 13/4072* (2013.01); *G06F 13/4081* (2013.01); *G06F 13/4282* (2013.01); *G06F 2213/0026* (2013.01); *G06F 2213/0042* (2013.01); *G06F 2213/3808* (2013.01); *H04L 2101/622* (2022.05)

(58) Field of Classification Search
USPC .......................................................... 710/304
See application file for complete search history.

(56) References Cited

U.S. PATENT DOCUMENTS

| | | | |
|---|---|---|---|
| 2006/0114894 | A1 | 6/2006 | Cherchali et al. |
| 2009/0164690 | A1* | 6/2009 | Slaight .................. G06F 13/385 710/306 |
| 2013/0031350 | A1 | 1/2013 | Thielen et al. |
| 2013/0262700 | A1 | 10/2013 | Tamura |
| 2015/0188753 | A1 | 7/2015 | Anumala et al. |
| 2015/0350014 | A1* | 12/2015 | McKeever, II ..... G06F 13/4022 370/254 |
| 2016/0036767 | A1* | 2/2016 | Gillon ................ H04L 61/2038 709/226 |
| 2016/0149749 | A1 | 5/2016 | Bunker et al. |
| 2016/0188508 | A1* | 6/2016 | Tung ..................... G06F 13/362 710/106 |
| 2016/0267035 | A1* | 9/2016 | Murphy .............. G06F 13/4027 |
| 2017/0017595 | A1* | 1/2017 | Schnell .............. G06F 13/4022 |
| 2017/0046297 | A1* | 2/2017 | Chang ................ G06F 13/4027 |
| 2017/0161227 | A1* | 6/2017 | Lai ..................... G06F 13/4282 |
| 2018/0060261 | A1* | 3/2018 | Chhor ................ G06F 13/4282 |
| 2018/0081843 | A1* | 3/2018 | Kadgi ..................... G06F 13/20 |
| 2018/0165053 | A1* | 6/2018 | Kuo .................. G09G 5/003 |
| 2018/0293197 | A1* | 10/2018 | Grobelny ........... G06F 13/4291 |
| 2018/0307290 | A1* | 10/2018 | Montero ................... G06F 1/28 |
| 2018/0376385 | A1 | 12/2018 | Killadi et al. |

* cited by examiner

DOCKING STATION, ELECTRICAL DEVICE, AND METHOD FOR CONFIGURING BASIC INPUT OUTPUT SYSTEM

RELATED APPLICATIONS

This application claims priority to U.S. Provisional Application Ser. No. 62/555,659 filed Sep. 8, 2017, which are herein incorporated by reference.

BACKGROUND

Technical Field

The present disclosure relates to a docking station. More particularly, the present disclosure relates to a docking station with network interface controller (NIC).

Description of Related Art

In recent years, as the development of the ultra-thin laptops and tablets, more and more electrical devices are designed without an embedded network interface controller (NIC). On the other hand, external NIC dongles or docks are widely used to connect the ultra-thin laptops and/or tablets to the Preboot eXecution Environment (PXE) network.

SUMMARY

One aspect of the present disclosure is related to a docking station. The docking station includes a network interface controller (NIC), a dock-side controller and a dock-side connector interface. The NIC is configured to transmit one or more management component transport protocol (MCTP) packets via a system management bus (SMbus). The dock-side controller is electrically coupled to the SMbus, and configured to encode the one or more MCTP packets to one or more vendor specific protocol (VSP) packets. The dock-side connector interface is electrically coupled to the dock-side controller, and configured to transmit the one or more VSP packets to an electrical device to control a basic input output system (BIOS) of the electrical device on the condition that the electrical device is connected to the docking station via the dock-side connector interface.

Another aspect of the present disclosure is related to an electrical device. The electrical device includes a basic input output system (BIOS), a host-side controller and a host-side connector interface. The BIOS is configured to transmit one or more management component transport protocol (MCTP) packets comprising system management BIOS information via a system management bus (SMbus). The host-side controller is electrically coupled to the SMbus, and configured to encode the one or more MCTP packets to one or more corresponding vendor specific protocol (VSP) packets. The host-side connector interface is electrically coupled to the host-side controller, and configured to transmit the one or more VSP packets to a docking station on the condition that the docking station is connected to the electrical device via the host-side connector interface, wherein a dock-side controller arranged in the docking station is configured to decode the one or more VSP packets to the one or more MCTP packets.

Yet another aspect of the present disclosure is related to a method for configuring a basic input output system. The method includes transmitting, by a network interface controller of a docking station, one or more management component transport protocol (MCTP) packets via a system management bus (SMbus); encoding, by a dock-side controller of the docking station, the one or more MCTP packets to one or more vendor specific protocol (VSP) packets; transmitting, via a connector interface, the one or more VSP packets to an electrical device; decoding, by a host-side controller of the electrical device, the one or more VSP packets to the one or more MCTP packets; and configuring a basic input output system of the electrical device according to the one or more MCTP packets.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiments, with reference made to the accompanying drawings as follows.

DETAILED DESCRIPTION

Reference will now be made in detail to the present embodiments of the disclosure, examples of which are illustrated in the accompanying drawings. The embodiments below are described in detail with the accompanying drawings, but the examples provided are not intended to limit the scope of the disclosure covered by the description. The structure and operation are not intended to limit the execution order. Any structure regrouped by elements, which has an equal effect, is covered by the scope of the present disclosure. Moreover, the drawings are for the purpose of illustration only, and are not in accordance with the size of the original drawing. The components in description are described with the same number to understand.

Although the terms "first," "second," etc., may be used herein to describe various elements, these elements should not be limited by these terms. These terms are used to distinguish one element from another.

In addition, in this document, the term "coupled" may also be termed as "electrically coupled," and the term "connected" may be termed as "electrically connected". "Coupled" and "connected" may also be used to indicate that two or more elements cooperate or interact with each other.

Figure 1:
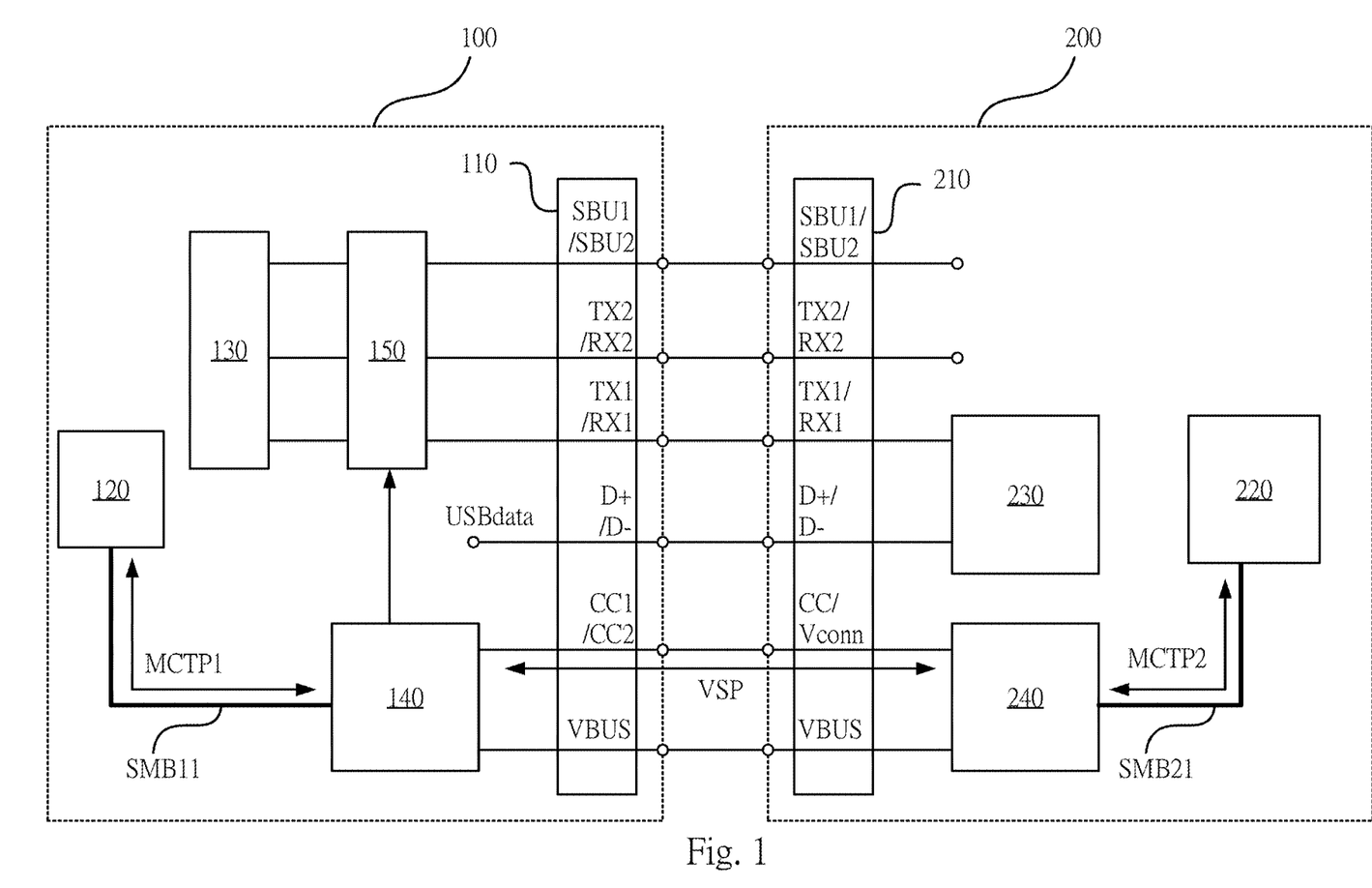
FIG. 1 is a schematic diagram illustrating an electrical device and a docking station according to some embodiments of the present disclosure.

Reference is now made to FIG. 1. FIG. 1 is a schematic diagram illustrating an electrical device 100 and a docking station 200 according to some embodiments of the present disclosure. In some embodiments, the electrical device 100 is a notebook, a tablet, or a smartphone. The docking station 200 may be configured to connect to the electrical device 100 via a connector interface and transmit signals via the connector interface.

In some embodiments, the electrical device 100 includes a host-side connector interface 110, a basic input output system (BIOS) 120, a processing circuit 130, a power delivery (PD) controller 140 and a signal switching circuit 150. The host-side connector interface 110 is electrically coupled to the power delivery (PD) controller 140 and the signal switching circuit 150 via corresponding pins. The BIOS 120 is electrically coupled to a system management bus (SMbus) SMB11, and electrically coupled to the PD controller 140 via the SMbus SMB11. The processing circuit 130 is electrically coupled to the signal switching circuit 150. In some embodiments, the signal switching circuit 150 includes one or more multiplexers controlled by the PD controller 140 to achieve the signal switching, in order to switches the signals to proper data paths according to various signal configuration cases to meet different application needs and the flip-ability of the connectors.

The docking station 200 includes a dock-side connector interface 210, a network interface controller (NIC) 220, a processing circuit 230 and a power delivery (PD) controller 240. The dock-side connector interface 210 is electrically coupled to the power delivery (PD) controller 240 and the processing circuit 230 via corresponding pins. The NIC 220 is electrically coupled to a SMbus SMB21, and electrically coupled to the PD controller 240 via the SMbus SMB21.

As shown in FIG. 1, in some embodiments, the connector interface may be a USB type-c interface. Alternatively stated, the host-side connector interface 110 and the dock-side connector interface 210 may respectively include USB type-c connectors connectable to each other. For example, the host-side connector interface 110 may be a USB type-c receptacle which includes a CC1 pin and a CC2 pin, and the dock-side connector interface 210 may be a USB type-c plug which includes a configuration channel (CC) pin and a Vconn pin.

Since the processing circuit 130 is coupled to the corresponding pins, such as SBU1/SBU2 pins, TX1/RX1 pins, and TX2/RX2 pins of the host-side connector interface 110, via the signal switching circuit 150, the processing circuit 130 may communicate with the docking station 200 to execute corresponding operations by transmitting and/or receiving data signals from and/or to the docking station 200 via the host-side and the dock-side connector interfaces 110 and 210.

As shown in FIG. 1, the processing circuit 230 in the docking station 200 is electrically coupled to the TX1/RX1 pins and D+/D− pins of the dock-side connector interface 210, and is able to communicate with the processing circuit 130 via the TX1/RX1 pins, or receiving and/or transmitting USB data signal via the D+/D− pins.

The BIOS 120 is configured to transmit one or more management component transport protocol (MCTP) packets MCTP1 over the SMbus SMB11, in which the MCTP packet(s) MCTP1 include system management BIOS information for control and/or configuration.

Specifically, Platform Level Data Model (PLDM) is designed to be an interface and data model that provides efficient access to low-level platform inventory, monitoring, control, event, and data/parameters transfer functions. For example, temperature, voltage, or fan sensors may have a PLDM representation that can be used to monitor or control the platform using a set of PLDM messages. The platform-level data models and platform functions may be implemented using MCTP communications and supported as a message type over MCTP. Accordingly, the Management Component Transport Protocol (MCTP) communication model may include a message format, transport description, message exchange patterns and operational endpoint characteristics. A lower level layer protocol may bind the MCTP layer to a specific physical medium such as the SMbus or PCIe.

The power delivery (PD) controller 140 is configured to receive the one or more MCTP packets MCTP1 from the BIOS 120, and encode the one or more MCTP packets to one or more corresponding vendor specific protocol packets VSP.

Accordingly, the host-side connector interface 110 may be configured to transmit the VSP packet(s) VSP via the configuration channel pins (CC1/CC2) to the docking station 200 on the condition that the docking station 200 is connected to the electrical device 100 via the host-side connector interface 110.

At the docking side, the PD controller 240 arranged in the docking station 200 may be configured to decode the VSP packet(s) to the MCTP packet(s) MCTP2, and transmit the MCTP packet(s) MCTP2 to the network interface controller (NIC) 220 via the SMbus SMB21.

In addition, the NIC 220 may also be configured to transmit one or more MCTP packets MCTP2 over the SMbus SMB21 for control and/or configuration of BIOS 120. Similarly to the operation stated above, the PD controller 240 is configured to receive the MCTP packet(s) MCTP2 from the NIC 220, and encode the MCTP packet(s) to corresponding vendor specific protocol packet(s) VSP. Accordingly, the dock-side connector interface 210 may be configured to transmit the VSP packet(s) VSP, via the CC pin to the electrical device 100, to control the BIOS 120 of the electrical device 100 on the condition that the electrical device 100 is connected to the docking station 200 via the dock-side connector interface 210.

Alternatively stated, the vendor specific protocol packet(s) VSP may be transmitted downstream and/or upstream. Thus, the network interface controller (NIC) 220 in the docking station 200 and the BIOS 120 in the electrical device may communicate with each other through the transmitted/received MCTP packet(s) MCTP1 and MCTP2 to achieve Desktop and mobile Architecture for System Hardware (DASH). Accordingly, a user may remotely control and configure the BIOS 120 with the co-operations of the circuits and controllers in the electrical device 100 and in the docking station 200.

Since, during the control and the configuration, the system management BIOS information are transmitted using vendor specific protocol packet(s) VSP through the existing pins in the connector interface, no extra pins are required. Therefore, an USB type-C standard connector may be applied for the host-side and dock-side connector interfaces 110 and 210, and thus the cost of design and manufacture is lowered.

Figure 2:
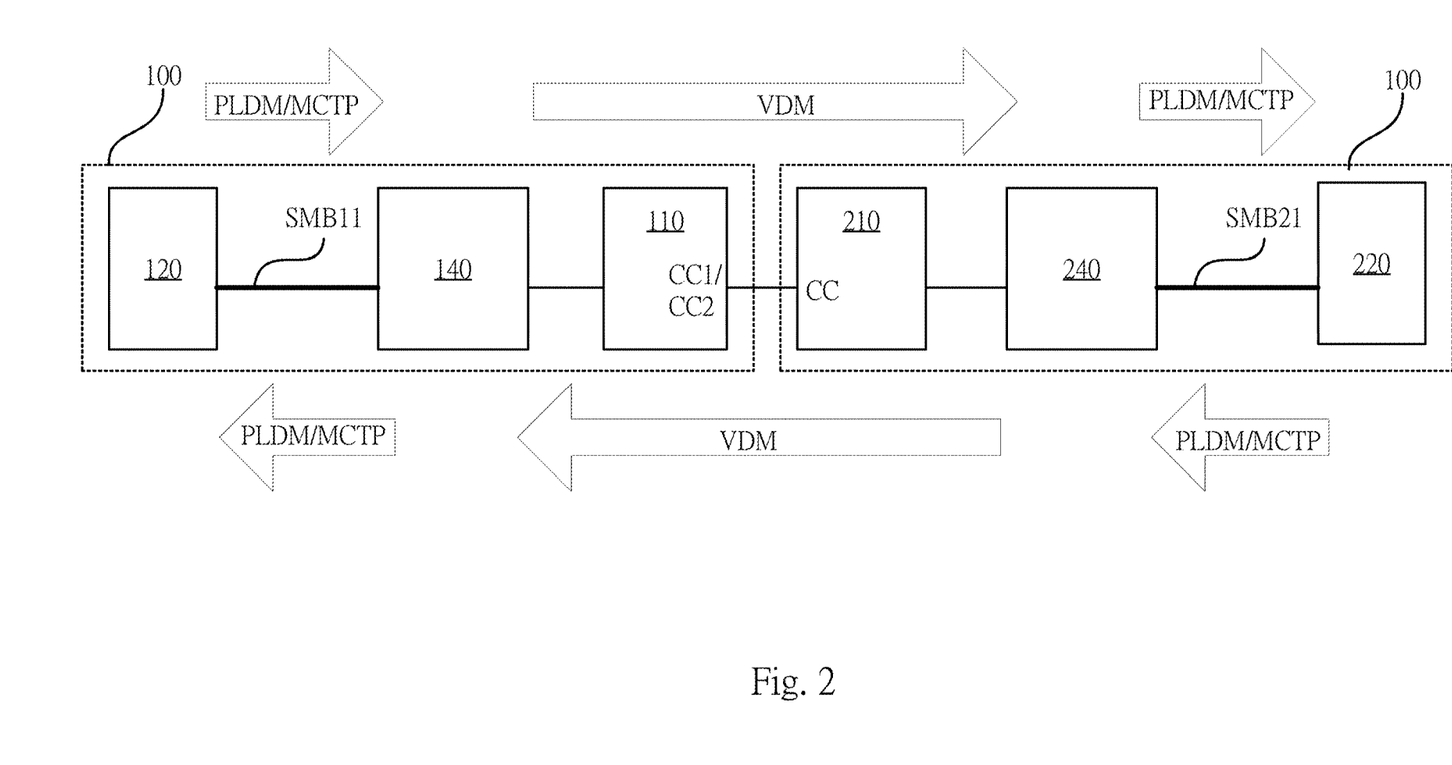
FIG. 2 is a schematic diagram illustrating the Desktop and mobile Architecture for System Hardware (DASH) protocol flow between the electrical device and the docking station according to some embodiments of the present disclosure.

For better understanding of the communication between the electrical device 100 and the docking station 200, reference is made to FIG. 2. FIG. 2 is a schematic diagram illustrating the DASH protocol flow between the electrical device 100 and the docking station 200 according to some embodiments of the present disclosure. Like elements in FIG. 2 are designated with the same reference numbers for ease of understanding.

As shown in FIG. 2, the vendor specific protocol packet(s) VSP may include a vendor defined message (VDM) VDM transmitted via the configuration channel pin (CC/CC1/CC2) electrically coupled to the power delivery (PD) controller 140 or 240. Specifically, in some embodiments, in the USB Power delivery Protocol Layer, the PD controller 140 or 240 may add the system management BIOS information in the MCTP packets MCTP1 or MCTP2 to a standard Vendor Defined Message format, and use the Vendor Defined Data Object (VDO) for the USB communication.

When receiving the MCTP packet(s) from the NIC 220, the PD controller 240 is configured to encode the PLDM over MCTP packet(s) to the vendor defined message VDM to the CC pin of the dock-side connector interface 210. On the other hand, when receiving the vendor defined message VDM from the CC pin of the dock-side connector interface 210, the PD controller 240 is configured to decode the vendor defined message VDM to the PLDM over MCTP packet(s), and transmit the MCTP packet(s) to the NIC 220.

Similarly, when receiving the vendor defined message VDM from the CC1/CC2 pins of the host-side connector interface 110, the PD controller 140 is configured to decode the vendor defined message VDM to the PLDM over MCTP packet(s), and transmit the MCTP packet(s) to the BIOS 120 to execute control and/or configuration. On the other hand, when receiving the MCTP packet(s) from the BIOS 120, the PD controller 140 is configured to encode the PLDM over MCTP packet(s) to the vendor defined message VDM, and transmit to the CC1/CC2 pins of the host-side connector interface 110.

Figure 3:
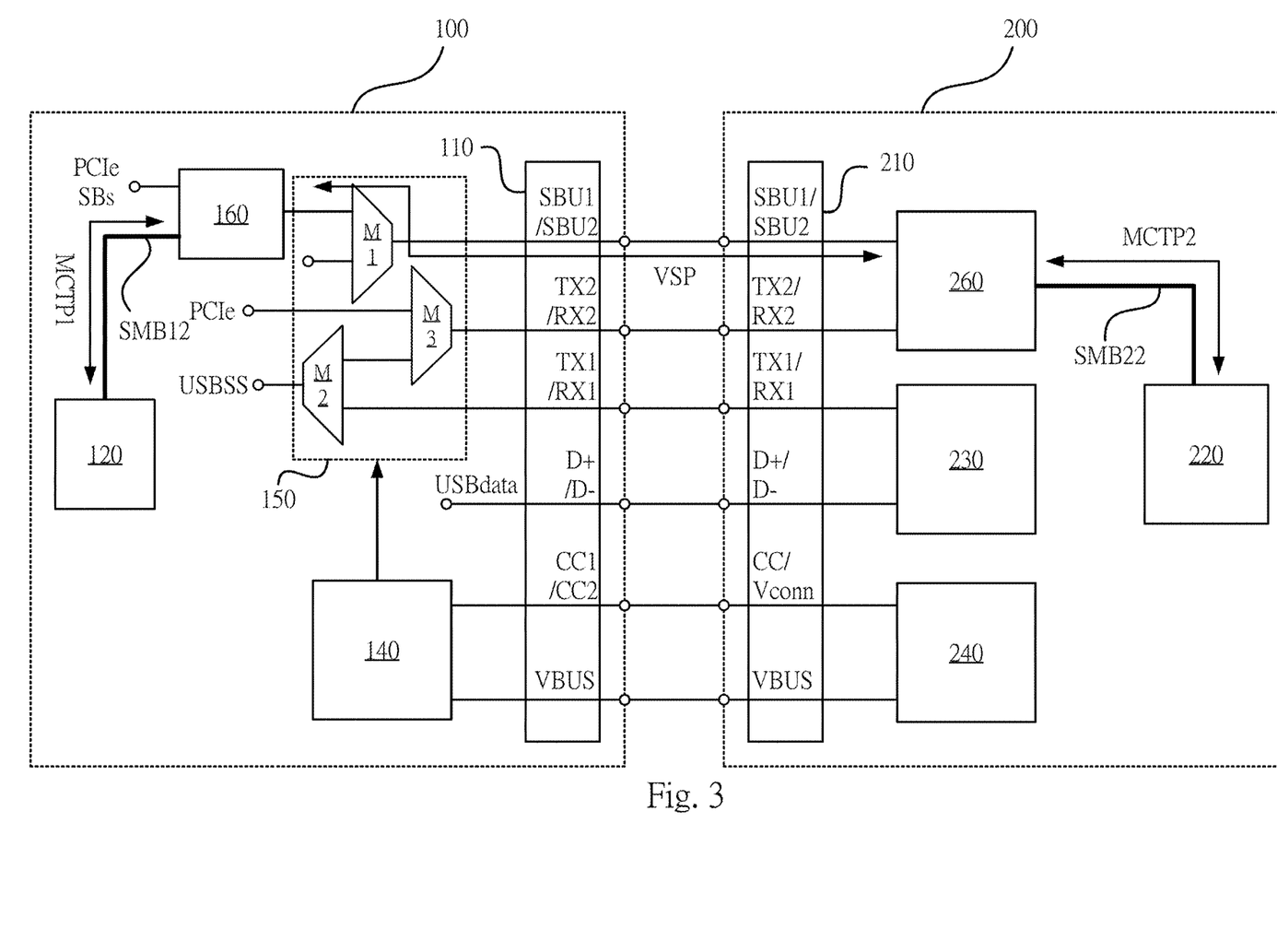
FIG. 3 is a schematic diagram illustrating the electrical device and the docking station according to some other embodiments of the present disclosure.

Reference is now made to FIG. 3. FIG. 3 is a schematic diagram illustrating the electrical device 100 and the docking station 200 according to some other embodiments of the present disclosure. Like elements in FIG. 3 are designated with the same reference numbers for ease of understanding. The specific operations of similar elements, which are already discussed in detail in above paragraphs, are omitted herein for the sake of brevity.

Compared to FIG. 1, in the embodiments of FIG. 3, the vendor specific protocol packet(s) VSP include corresponding peripheral component interconnect express (PCIe) protocol packet(s) transmitted via the sideband use pins (SBU1/SBU2) of the usb type-c connector. Accordingly, the electrical device 100 includes a PCIe sideband controller 160 electrically coupled to the SBU1/SBU2 pin of the host-side connector interface 110, and the docking station 200 also includes a PCIe sideband controller 260 electrically coupled to the SBU1/SBU2 pin of the dock-side connector interface 210. For example, in some embodiments, a thunderbolt interface integrating PCIe and DisplayPort may be applied in the embodiments shown in FIG. 3.

In addition, the PCIe sideband controllers 160 and 260 are respectively coupled to the SMbus SMB12 and the SMB22, such that the MCTP packet(s) MCTP1 may be transmitted between the BIOS 120 and the PCIe sideband controllers 160 bidirectionally, and the MCTP packet(s) MCTP2 may be transmitted between the NIC 220 and the PCIe sideband controllers 260 bidirectionally.

Accordingly, the PCIe sideband controllers 160 and 260 may respectively encode the MCTP packet(s) MCTP1 and MCTP2 to the PCIe protocol packet(s), or decode the PCIe protocol packet to the MCTP packet(s) MCTP1 and MCTP2.

As shown in FIG. 3, in some embodiments, the PCIe sideband controller 160 is coupled to the signal switching circuit 150. The signal switching circuit 150 includes multiplexers M1, M2, and M3 to achieve the signal switching for signals including PCIeSBs, MCTP1, PCIe, USBSS, to meet different application needs and the flip-ability of the type-c connectors. Multiplexers M1, M2, and M3 may be properly controlled by the PD controller 140 according to the configuration channel (CC) signal, and further explanation is omitted herein for the sake of brevity. It is noted that, various modifications may be made to achieve the signal switching circuit 150, and the connection of the multiplexers illustrated in FIG. 3 is an example and not meant to limit the present disclosure.

Accordingly, the PCIe sideband controller 160 may transmit and/or receive the vendor specific protocol packet(s) VSP via the multiplexer M1 in the signal switching circuit 150 and the SBU1/SBU2 pin of the host-side connector interface 110. Similarly, the PCIe sideband controller 260 may also transmit and/or receive the vendor specific protocol packet(s) VSP via the SBU1/SBU2 pin of the dock-side connector interface 210.

Figure 4:
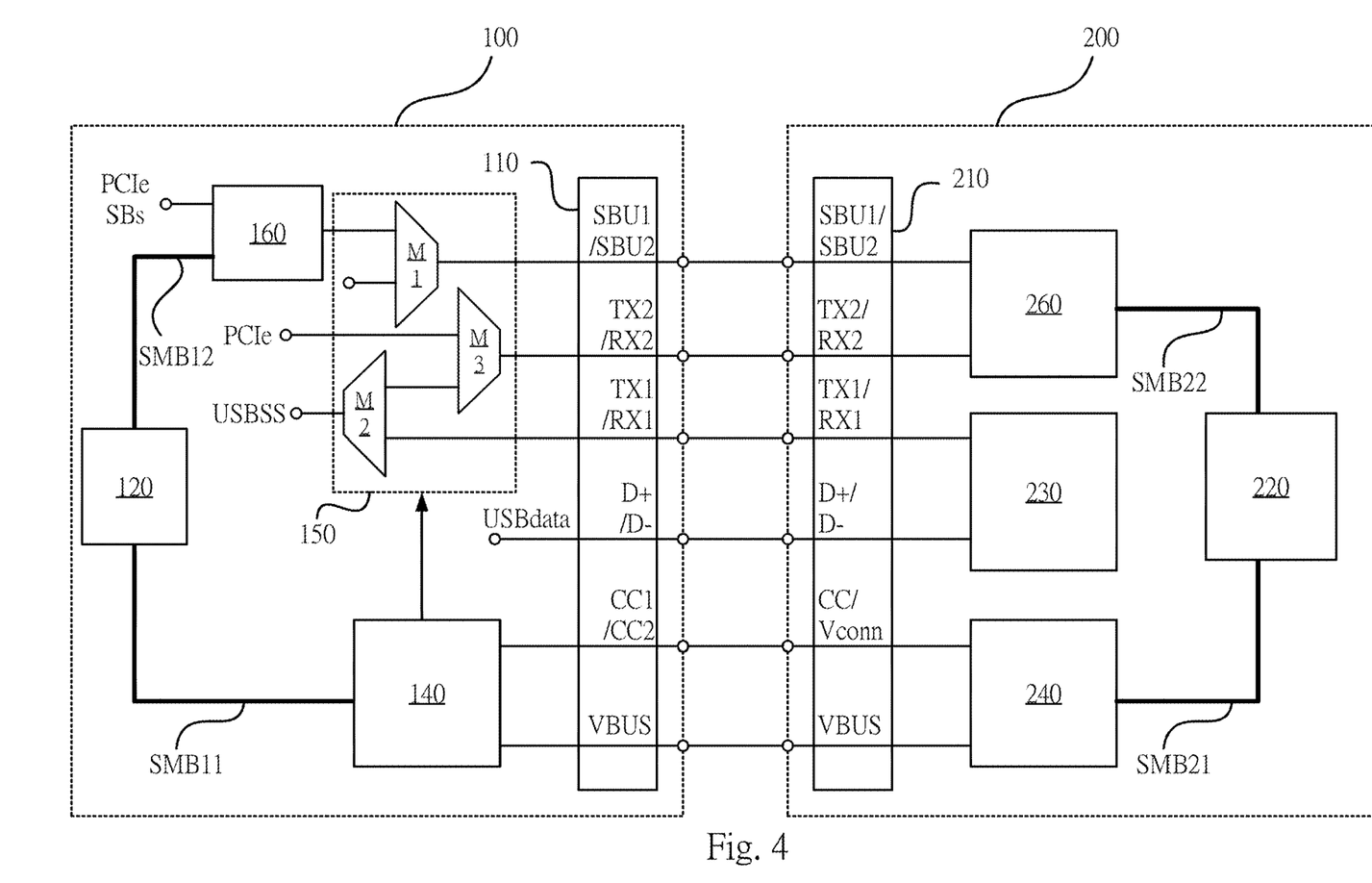
FIG. 4 is a schematic diagram illustrating the electrical device and the docking station according to some other embodiments of the present disclosure.

Reference is now made to FIG. 4. FIG. 4 is a schematic diagram illustrating the electrical device 100 and the docking station 200 according to some other embodiments of the present disclosure. Like elements in FIG. 4 are designated with the same reference numbers for ease of understanding. In some embodiments, the BIOS 120 may be coupled to the PD controller 140 via the SMbus SMB11 and to the PCIe sideband controller 160 via the SMbus SMB12. The NIC 220 may be coupled to the PD controller 240 via the SMbus SMB21 and to the PCIe sideband controller 260 via the SMbus SMB22. Alternatively stated, DASH remote control and configuration may be achieved via the dock-side controller and the host-side controller, in which the controllers may be the PD controllers 140, 240, or the PCIe sideband controllers 160, 260.

In some embodiments, the NIC 220 arranged in the docking station 200 is configured to transmit the MCTP packet(s) for an in-band or an out-of-band configuration of the BIOS 120 of the electrical device 100. For example, user could configure system through the MCTP packets over SMBus and over VSP packets while system is In-Band. In cases such as the power loss of the electrical device 100, or the accidentally disconnection between the electrical device 100 and the docking station 200, the NIC 220 is still able to communicate with the BIOS 120 and executes control and configuration through the MCTP packets over SMBus and over VSP packets.

In addition, in some embodiments, the NIC 220 is also able to execute a Wake-On-LAN/Wake-On-WAN and provide a wake signal in the out-of-band management for instructing wake-up to the BIOS 120 through the one or more MCTP packets over SMBus over VSP packets, in order to remotely wake up the electrical device 100 while system is under out-of-band.

Figure 5:
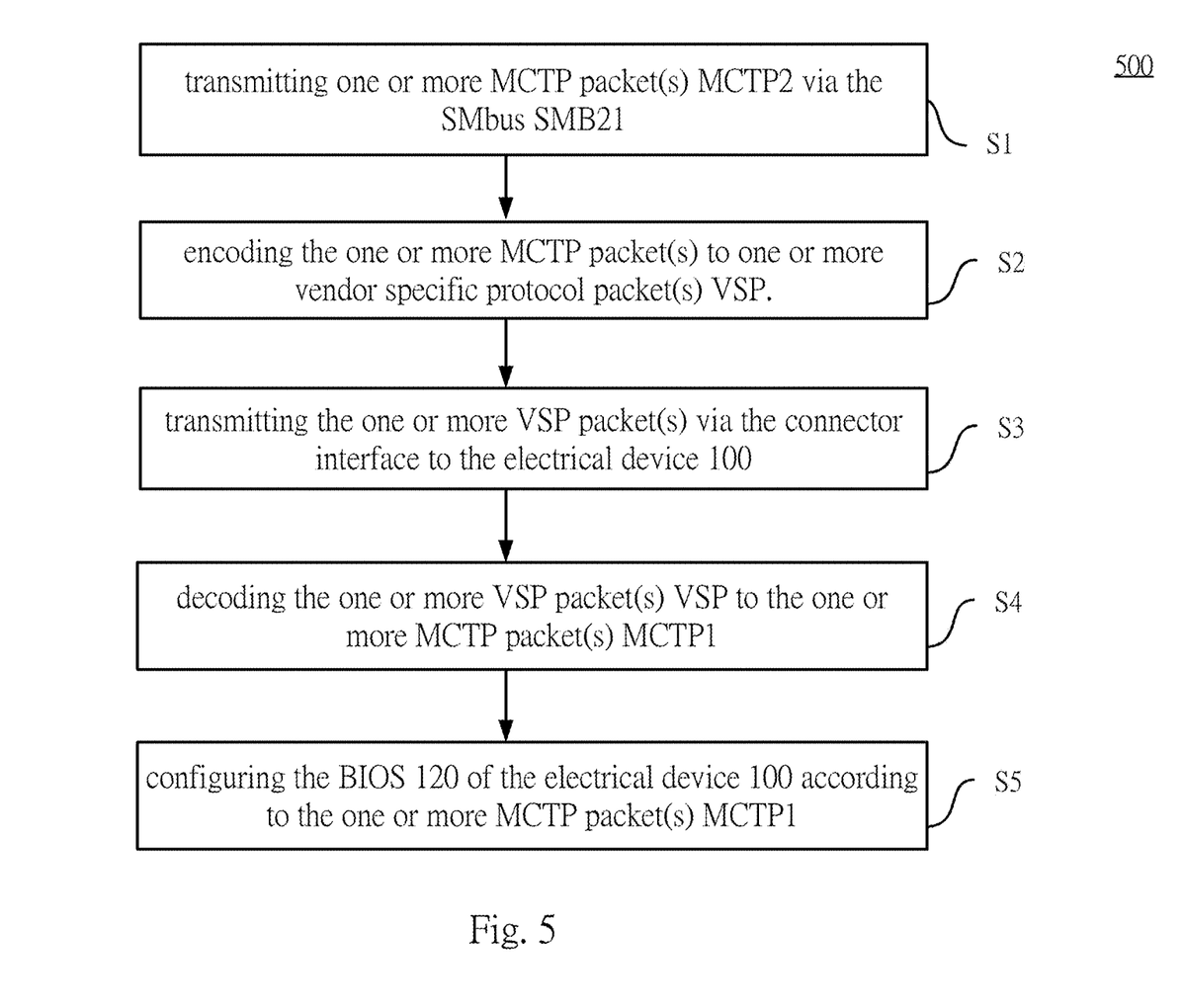
FIG. 5 is a flow chart of a method for configuring the basic input output system of the electrical device in accordance with some embodiments of the present disclosure.

Reference is made to FIG. 5. FIG. 5 is a flow chart of a method 500 for configuring the basic input output system (BIOS) 120 of the electrical device 100 in accordance with some embodiments of the present disclosure. For better understanding of the present disclosure, the method 500 is discussed in relation to the embodiments shown in FIGS. 1-4, but is not limited thereto.

As shown in FIG. 5, the method 500 includes operations S1, S2, S3, S4, and S5. First, in the operation S1, the NIC 220 of the docking station 200 transmits one or more MCTP packet(s) MCTP2 via the SMbus SMB21.

Next, in the operation S2, the dock-side controller (e.g., PD controller 240 or PCIe sideband controller 260) of the docking station 200 encodes the one or more MCTP packet(s) to one or more vendor specific protocol packet(s) VSP.

Next, in the operation S3, the one or more VSP packet(s) are transmitted via the connector interface (e.g., the host-side connector interface 110 and the dock-side connector interface 210) to the electrical device 100.

Next, in the operation S4, the host-side controller (e.g., PD controller 140 or PCIe sideband controller 160) of the electrical device 100 decodes the one or more VSP packet(s) VSP to the one or more MCTP packet(s) MCTP1.

Next, in the operation S5, the BIOS 120 of the electrical device 100 is configured according to the one or more MCTP packet(s) MCTP1.

For example, in some embodiments, an in-band or out-of-band management is executed for the BIOS 120 through the one or more MCTP packet(s) MCTP1. In some embodiments, a wake signal is provided in the out-of-band management for instructing wake-up to the BIOS 120 through the one or more MCTP packet(s) MCTP1.

With respect to FIG. 1, in some embodiments, the vendor specific protocol packet(s) includes a vendor defined message. In the operation S3, the vendor defined message (VDM) is transmitted via the configuration channel pin (CC pin) of the usb type-c connector.

With respected to FIG. 3, in some other embodiments, the vendor specific protocol packet(s) includes a PCIe protocol packet. In the operation S3, the PCIe protocol packet is transmitted via the sideband use pins (SBU1/SBU2) of the usb type-c connector.

In addition, it should be noted that in the operations of the abovementioned method 500, no particular sequence is required unless otherwise specified. Moreover, the operations may also be performed simultaneously or the execution times thereof may at least partially overlap.

Furthermore, the operations of the method 500 may be added to, replaced, and/or eliminated as appropriate, in accordance with various embodiments of the present disclosure.

Through the operations of various embodiments described above, the DASH function of the system may be achieved in the electrical device 100 and the docking station 200 connected via an USB type-C standard connector.

Although the present disclosure has been described in considerable detail with reference to certain embodiments thereof, other embodiments are possible. Therefore, the scope of the appended claims should not be limited to the description of the embodiments contained herein.

What is claimed is:

1. A docking station comprising:
a network interface controller (NIC) configured to transmit one or more management component transport protocol (MCTP) packets via a system management bus (SMbus);
a dock-side controller electrically coupled to the SMbus, and configured to encode the one or more MCTP packets to one or more vendor specific protocol (VSP) packets; and
a dock-side connector interface electrically coupled to the dock-side controller, and configured to transmit the one or more VSP packets to an electrical device to control a basic input output system (BIOS) of the electrical device on the condition that the electrical device is connected to the docking station via the dock-side connector interface.

2. The docking station of claim 1, wherein the dock-side connector interface comprises an usb type-c connector.

3. The docking station of claim 2, wherein the one or more VSP packets comprises a vendor defined message (VDM) transmitted via a configuration channel pin of the usb type-c connector.

4. The docking station of claim 3, wherein the dock-side controller comprises a power delivery controller electrically coupled to the configuration channel pin and configured to encode the one or more MCTP packets to the VDM, or decode the VDM to the one or more MCTP packets.

5. The docking station of claim 2, wherein the one or more VSP packets comprises a peripheral component interconnect express (PCIe) protocol packet transmitted via a sideband use pin of the usb type-c connector.

6. The docking station of claim 5, wherein the dock-side controller comprises a PCIe sideband controller electrically coupled to the sideband use pin and configured to encode the one or more MCTP packets to the PCIe protocol packet, or decode the PCIe protocol packet to the one or more MCTP packets.

7. The docking station of claim 1, wherein the network interface controller is configured to transmit the one or more MCTP packets for an in-band or an out-of-band configuration of the BIOS of the electrical device.

8. The docking station of claim 1, wherein a host-side controller arranged in the electrical device is configured to decode the one or more VSP packets to the one or more MCTP packets for configuration of the BIOS of the electrical device.

9. An electrical device comprising:
a basic input output system (BIOS) configured to transmit one or more management component transport protocol (MCTP) packets comprising system management BIOS information via a system management bus (SMbus);
a host-side controller electrically coupled to the SMbus, and configured to encode the one or more MCTP packets to one or more corresponding vendor specific protocol (VSP) packets; and
a host-side connector interface electrically coupled to the host-side controller, and configured to transmit the one or more VSP packets to a docking station on the condition that the docking station is connected to the electrical device via the host-side connector interface, wherein a dock-side controller arranged in the docking station is configured to decode the one or more VSP packets to the one or more MCTP packets.

10. The electrical device of claim 9, wherein the host-side connector interface comprises an usb type-c connector.

11. The electrical device of claim 10, wherein the one or more vendor specific protocol packets comprises a vendor defined message (VDM) transmitted via a configuration channel pin of the usb type-c connector.

12. The electrical device of claim 11, wherein the host-side controller comprises a power delivery controller electrically coupled to the configuration channel pin and configured to encode the one or more MCTP packets to the VDM, or encode the VDM to the one or more MCTP packets.

13. The electrical device of claim 10, wherein the one or more VSP packets comprises a PCIe protocol packet transmitted via a sideband use pin of the usb type-c connector.

14. The electrical device of claim 13, wherein the host-side controller comprises a PCIe sideband controller electrically coupled to the sideband use pin and configured to encode the one or more MCTP packets to the PCIe protocol packet, or encode the PCIe protocol packet to the one or more MCTP packets.

15. The electrical device of claim 9, wherein the BIOS is configured in-band or out-of-band by a network interface controller arranged in the docking station.

16. A method for configuring a basic input output system, comprising:

transmitting, by a network interface controller of a docking station, one or more management component transport protocol (MCTP) packets via a system management bus (SMbus);

encoding, by a dock-side controller of the docking station, the one or more MCTP packets to one or more vendor specific protocol (VSP) packets;

transmitting, via a connector interface, the one or more VSP packets to an electrical device;

decoding, by a host-side controller of the electrical device, the one or more VSP packets to the one or more MCTP packets; and configuring a basic input output system of the electrical device according to the one or more MCTP packets.

17. The method for configuring the basic input output system of claim 16, wherein the connector interface comprises an usb type-c connector, the one or more vendor specific protocol packets comprises a vendor defined message (VDM), and the method further comprises:

transmitting the VDM via a configuration channel pin of the usb type-c connector.

18. The method for configuring the basic input output system of claim 16, wherein the connector interface comprises an usb type-c connector, the one or more VSP packets comprises a peripheral component interconnect express (PCIe) protocol packet, and the method further comprises:

transmitting the PCIe protocol packet via a sideband use pin of the usb type-c connector.

19. The method for configuring the basic input output system of claim 16, further comprising:

executing an in-band or out-of-band management for the basic input output system through the one or more MCTP packets.

20. The method for configuring the basic input output system of claim 19, further comprising:

providing a wake signal in the out-of-band management for instructing wake-up to the basic input output system through the one or more MCTP packets.

\* \* \* \* \*